United States Patent [19]
Wei

[11] Patent Number: 5,647,565
[45] Date of Patent: Jul. 15, 1997

[54] TRIPOD

[76] Inventor: David Wei, 6F, No. 17, Tch Huey St., Taipei, Taiwan

[21] Appl. No.: 612,334

[22] Filed: Mar. 7, 1996

[51] Int. Cl.⁶ ................................................. F16M 11/38
[52] U.S. Cl. ...................................... 248/168; 248/177.1
[58] Field of Search ................................... 248/168, 682, 248/688, 166, 167, 177.1, 187.1

[56] References Cited

U.S. PATENT DOCUMENTS

| | | | |
|---|---|---|---|
| 3,300,165 | 1/1967 | O'Kane | 248/168 |
| 5,390,885 | 2/1995 | Shen | 248/168 |

*Primary Examiner*—Leslie A. Braun
*Assistant Examiner*—Willie Berry, Jr.

[57] ABSTRACT

A tripod including a hinge plate pivotally connecting a left front leg and a right front leg capable of side displacement and arranged in an overlapping manner, a rear leg having a fork in an upper end thereof for accommodating the hinge plate when the tripod is not in use, and a camera platform pivotally joined together with the hinge plate and the rear leg by means of a pivot rod. The camera platform, the rear leg and the hinge plate may displace with the pivot rod as their common pivot. A knob is locked to an extreme end of the pivot rod to lock and position the hinge plate, the rear leg and the camera platform after their angles have been adjusted and set. When the tripod is not in use, the knob is released to close the legs such that the left and right front legs overlap and lie against the rear leg, with the hinge plate accommodated within the fork of the rear leg, and the camera platform is turned through a suitable angle to be in alignment with the legs, so that the tripod as a whole appears as a compact plate-like structure, facilitate carrying and storage.

1 Claim, 6 Drawing Sheets

PRIOR ART

TRIPOD

BACKGROUND OF THE INVENTION (a) Field of the Invention

The present invention related generally to a tripod, and more particularly to a tripod which is compact, space-saving and convenient to carry. Besides, the tripod of the invention allows easy angle adjustment of the legs and provides considerable firm support for a photographic apparatus mounted thereon.

(b) Description of the Prior Art

Conventional tripods are generally of a structure shown in FIG. 1. A tripod A of the conventional structure mainly comprises a camera platform A1 for supporting a photographic apparatus B and three legs A2 capable of turning and bending. In use, the user has to stretch the legs A2 to a suitable extent and angle so that the tripod may stand on the floor before positioning the photographic apparatus B. However, since the legs A2 are without any positioning or supporting means to properly position them on the floor, if the photographic apparatus B is very heavy, the set angle of the legs A2 may change. Worse still, the tripod A may collapse due to the heavy weight of the photographic apparatus B. Besides, since there is not any positioning means among the legs A2, the user has to bend the legs A2 to a suitable angle one by one so that the weight of the photographic apparatus B may be evenly distributed to be borne by the legs A2, which is not only very troublesome but also time-consumptive. If the legs A2 are not properly adjusted, the stability of the tripod A will be affected. Moreover, when the user wants to close the tripod A, he/she can only pull the legs A2 together to a certain extent. When the user carries the tripod in a bag or rucksack, the fixed camera platform A1 will bulge therefrom, which is very unsightly. Therefore, although conventional tripods are rather small in size, they have the above-mentioned disadvantages.

SUMMARY OF THE INVENTION

According to an aspect of the present invention, the tripod comprises a camera platform, left and right front legs and a rear leg, all of which are substantially plate-like structures of a certain rigidity and are pivotally joined together by means of a pivot rod so that the legs and the camera platform may open or close to a suitable extent with the pivot rod as a pivot; a knob being turnably locked onto a rear end of the pivot rod so that the legs and the camera platform may be properly positioned and the set angles maintained, providing better support and stability for the tripod.

According to another aspect of the present invention, a rear leg of the tripod has a fork formed in an upper end thereof so that a hinge plate may be accommodated within the fork when the legs of the tripod are closed, and the angle of a camera platform may be adjusted so that the camera platform is in alignment with the closed legs when the tripod is not in use, facilitating carrying and storage.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
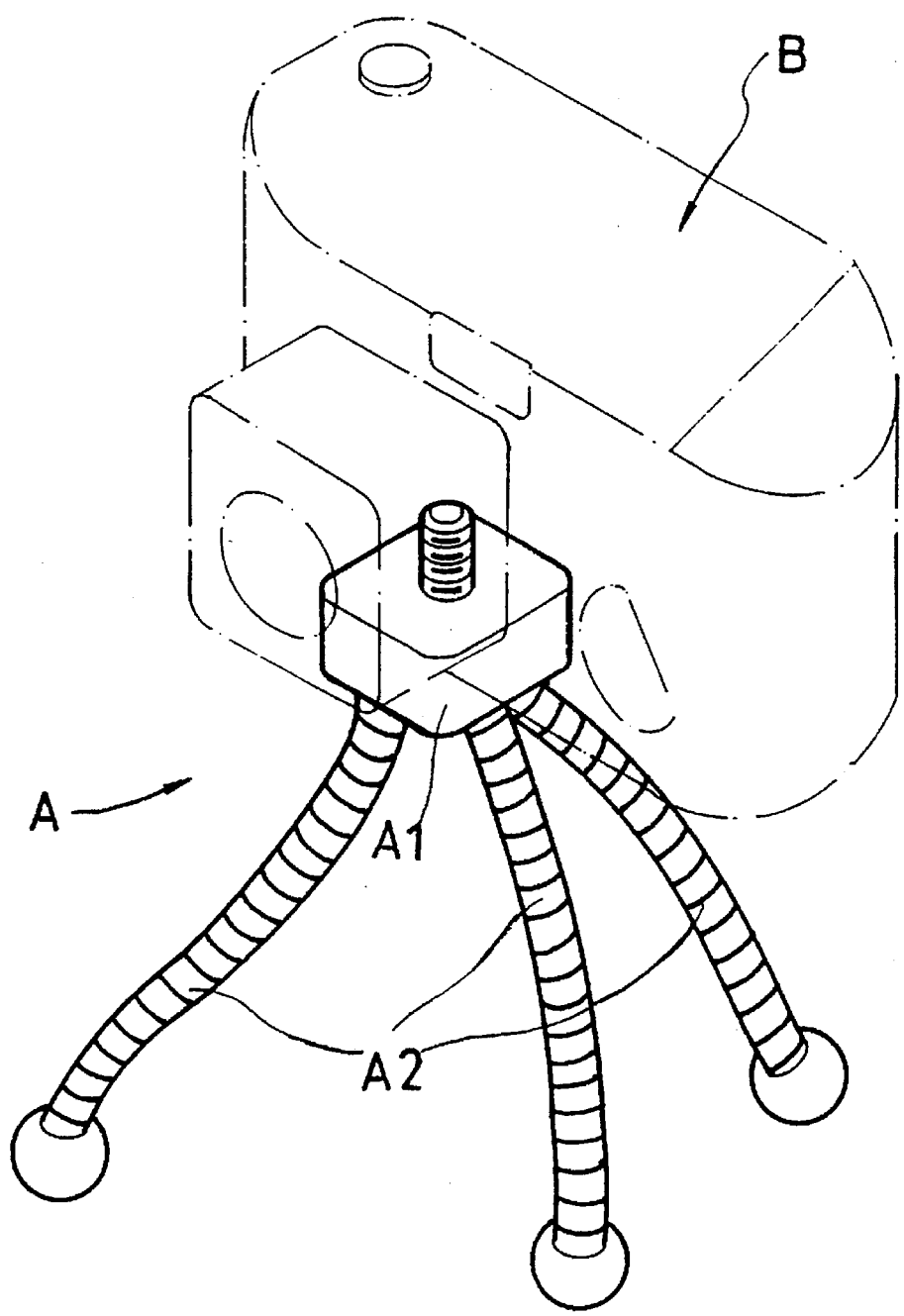
FIG. 1 is a schematic view of a tripod of the prior art.
Figure 2:
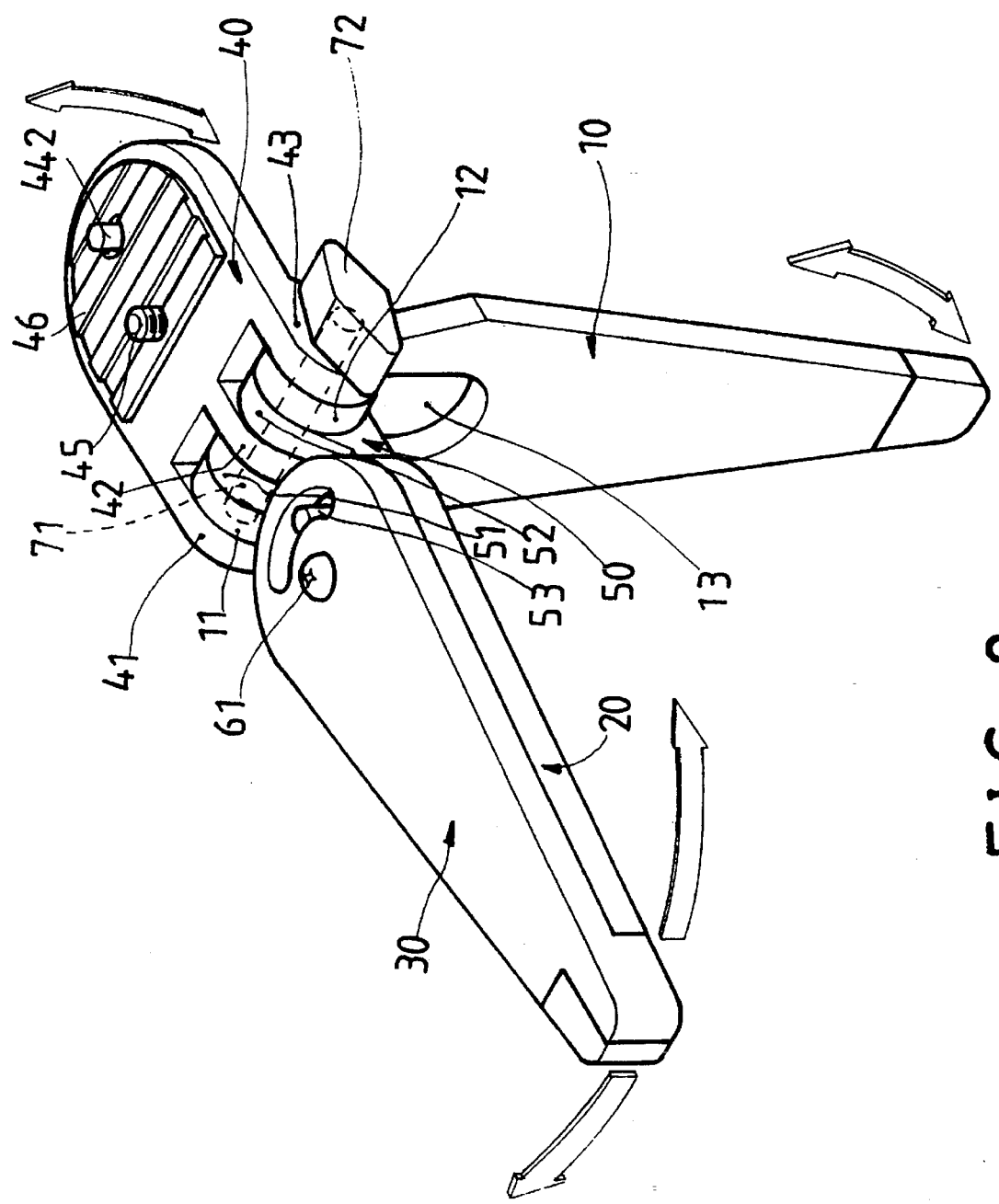
FIG. 2 is an elevational view of a preferred embodiment of the tripod of the invention.

The essential structure of a preferred embodiment of the tripod of the present invention is shown in FIG. 2. It mainly comprises a hinge plate 50 pivotally connected to a left front leg 20 and a right front leg 30, both of which may be connected in an overlapping manner to constitute a front leg support for the tripod and are capable of left and right side displacement. The tripod of the invention further comprises a rear leg 10 connected to the hinge plate 50 and capable of performing forward and backward displacement, a camera platform 40 capable of angle adjustment and connected to the hinge plate 50 and the rear leg 10, and a pivot rod 71 piovtally joining them.

Figure 3:
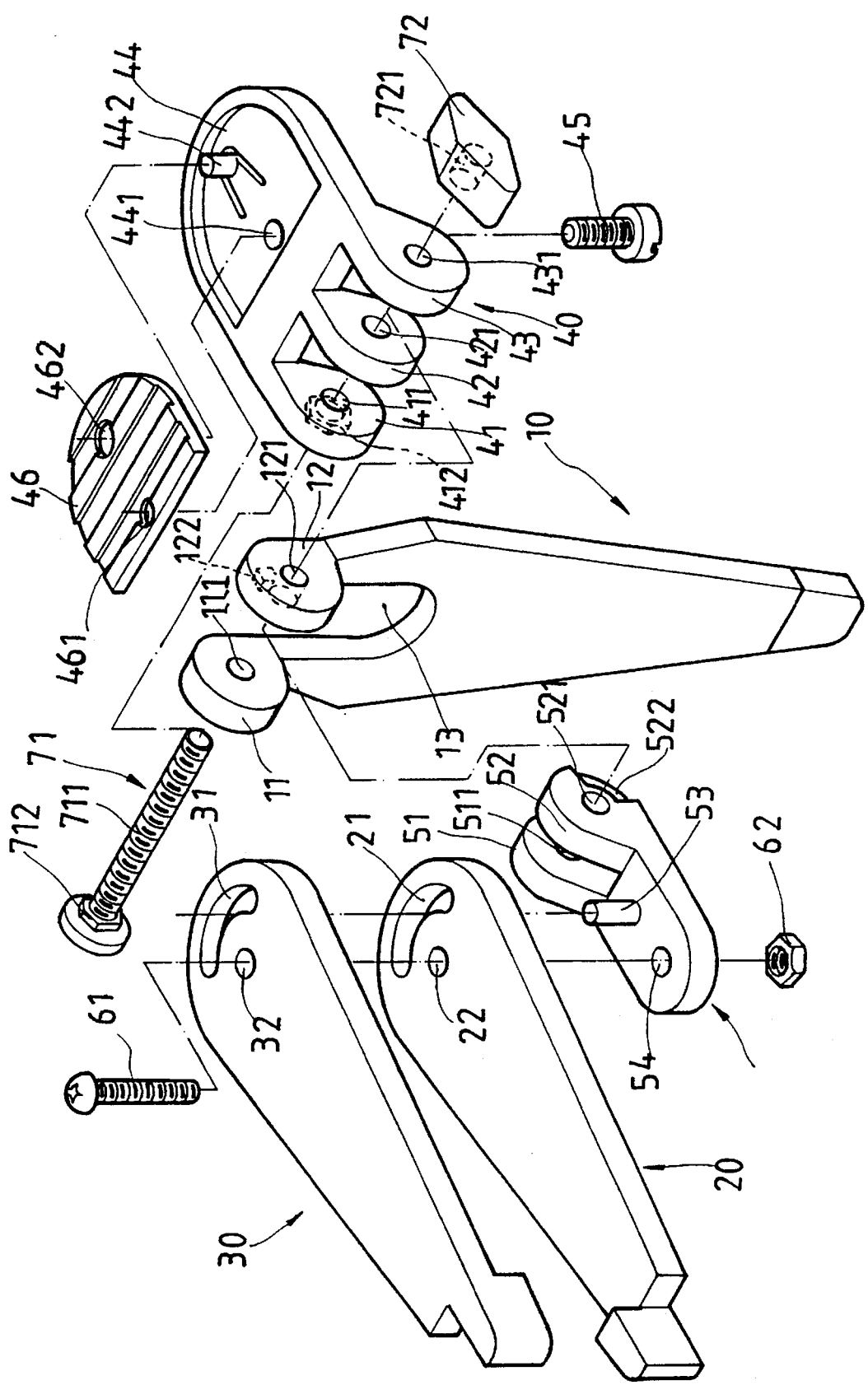
FIG. 3 is an exploded view of the tripod of the invention.

With reference to FIG. 3, the rear leg 10 is a plate-like structure having a fork 13 in an upper portion thereof, with two pivotal portions 11 and 12 formed at both sides of the fork 13. The pivotal portions 11 and 12 have pivotal holes 111 and 121 respectively formed in a central portion thereof. The pivotal portion 12 further has a lug 122 provided on an inner side thereof.

The left front leg 20 and the right front leg 30 are plate-like structures of substantially the same shape. They are respectively provided with through holes 22 and 32 near their upper ends and curved slots 21 and 31 between the through holes 22, 32 and their upper ends.

The hinge plate 50 consists of a planar section and two raised pivotal portions 51 and 52 at one end thereof. The shape and size of the hinge plate 50 is substantially the same as the fork 13 of the rear leg 10. The pivotal portions 51 and 52 of the hinge plate 50 are also respectively provided with central pivotal holes 511, 521. The pivotal portion 52 further has a depression 522 for matching the lug 122 of the pivotal portion 12 of the rear leg 10. By means of the arrangement of the lug 12 and the depression 522, the extent of outward displacement of the hinge plate 50 and the rear leg 10 may be controlled. In other words, the maximum outward displacement of the rear leg 10 and the left and right front legs 20 and 30 may be controlled. The hinge plate 50 is further provided with a through hole 54 for matching the through holes 22 and 32 and a post 53 for passing through the curved slots 21 and 31 of the left and right front legs 20 and 30 for restricting the maximum outward displacement of the left and right front legs 20 and 30. A screw 61 is used to pass through the through holes 32, 20 and 54 to be locked with a nut 62 so as to pivotally secure the right and leg front legs 30 and 20 to the hinge plate 50.

The camera platform 40 is also a plate-like structure. It has three equally spaced apart pivotal portions 41, 42 and 43 formed at a bottom end thereof, such that the respective pivotal portions 11 and 51 of the rear leg 10 and the hinge plate 50 are together accommodated between the space between the pivotal portions 41 and 42 of the camera platform 40 and the respective pivotal portions 12 and 52 of the rear leg 10 and the hinge plate 50 are together accommodated between the space between the pivotal portions 42 and 43 of the camera platform 40. The pivotal portions 41, 42 and 43 of the camera platform 40 are also provided with centrally disposed pivotal holes 411, 421 and 431 respectively. The pivotal portion 41 is further provided with a polygonal depression 412 at an outer side thereof. The camera platform 40 further has a recess 44 formed in an upper side thereof, with a holes 441 and a projection 442 provided on the recess 44. A support plate 46 made of soft plastics material and provided with holes 461 and 462 is placed on the recess 44 such that a screw 45 may pass through the holes 441 and 461 of the camera platform 40 and the support plate respectively and the projection 442 may project through the hole 462 to facilitate locking of photographic equipment (such as a camera or video camera) on the camera platform 40.

In assembly, with reference to FIGS. 2 and 3, the pivot rod 71 is used to lock the camera platform 40, the rear leg 10 and the hinge plate 50 together by passing through their pivotal holes. The pivot rod 71 has a threaded portion 711 and a polygonal raised portion 712 behind a head portion such that, when the raised portion 712 may fit into the polygonal depression 412 of the pivotal portion 41 of the camera platform 40 when the pivot rod 71 joins the camera platform 40, the rear leg 10 and the hinge plate 50, preventing turning of the pivot rod 71. A knob 72 having a central locking hole 721 is provided for locking onto the extreme end of the pivot rod 71 so that, after locking, the pivot rod 71 and the knob 72 may exert pressure on both sides of the camera platform 40, thereby firmly locking and positioning the pivotally joined camera platform 40, rear leg 10 and hinge plate 50 at a desired angle.

Figure 4A:
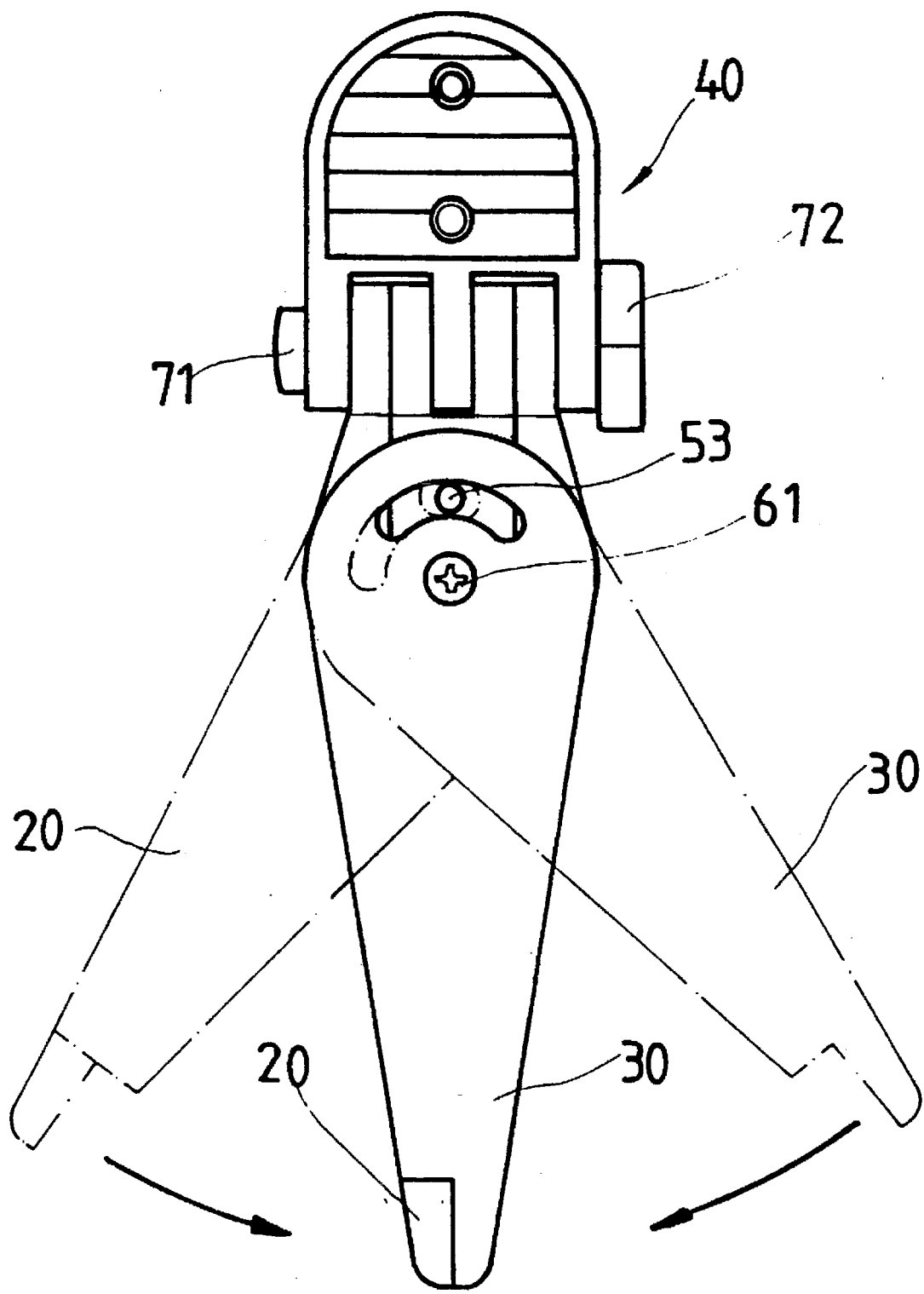
FIG. 4(A) is a front view of the tripod of the invention, showing the adjustment of the left and right front legs of the tripod.
Figure 4B:
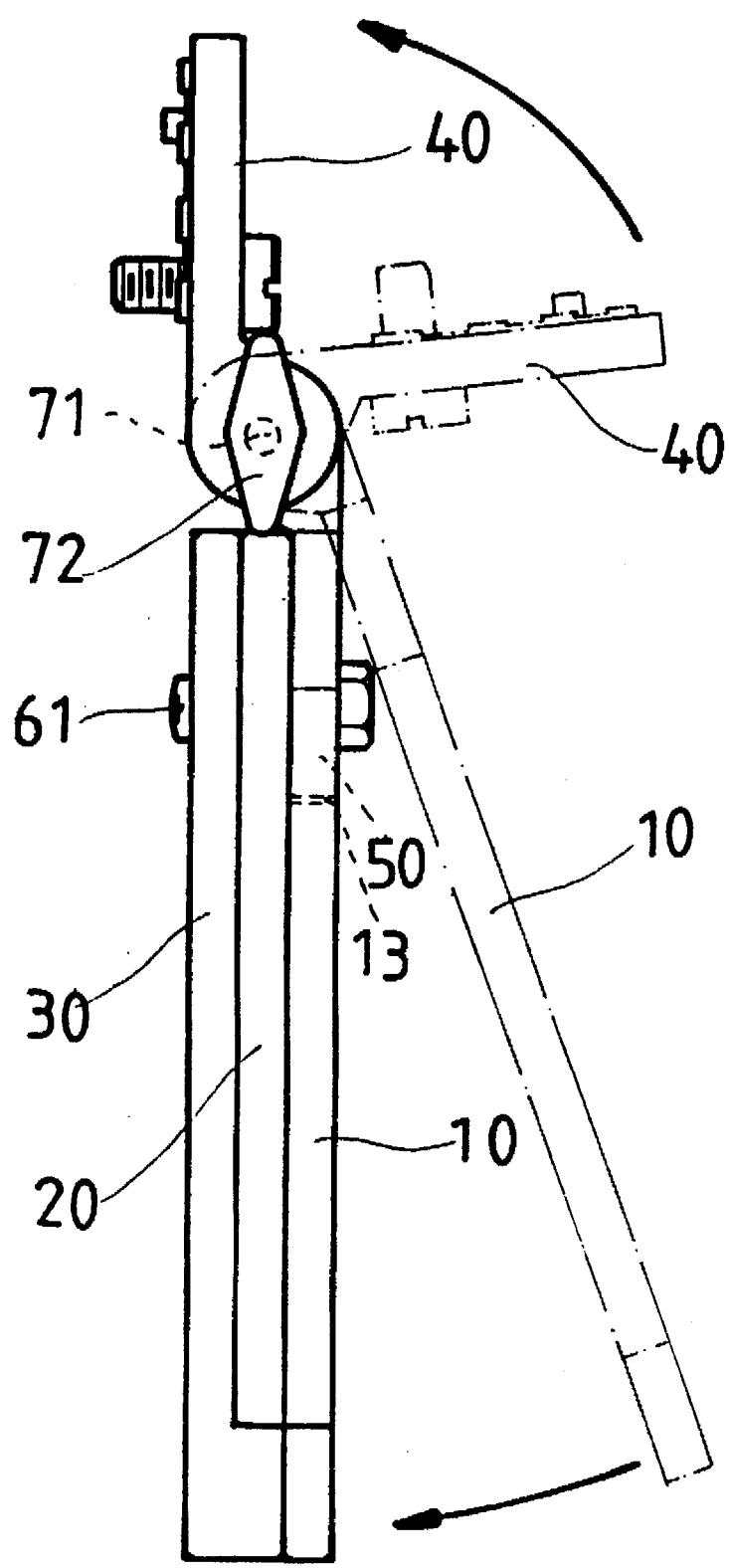
FIG. 4(B) is a side view of the tripod of the invention, showing the adjustment of the rear leg and the camera platform of the tripod.

Referring to FIG. 4(A), the left and right front legs 20 and 30 may displace to the sides with the screw 61 as the pivot. The displacement angle may be set and locked by adjusting the screw 61. Referring to FIG. 4(B), the camera platform 40, rear leg 10 and hinge plate 50 may displace and their angle may be adjusted with the pivot rod 71 as the pivot. The set angle may be firmly positioned by means of the knob 72. When it is desired to close the legs of the tripod of the invention, it is only necessary to release the knob 72 so that the left and right front legs 20 and 30 may be moved to rest against the rear leg 10 in an aligned manner, and the hinge plate 50 is pushed into the fork 13 of the rear leg 10. The camera platform 40 is then turned upwardly so that it is in alignment with the legs, so that the entire tripod of the invention appears as an integral linear structure.

Figure 5:
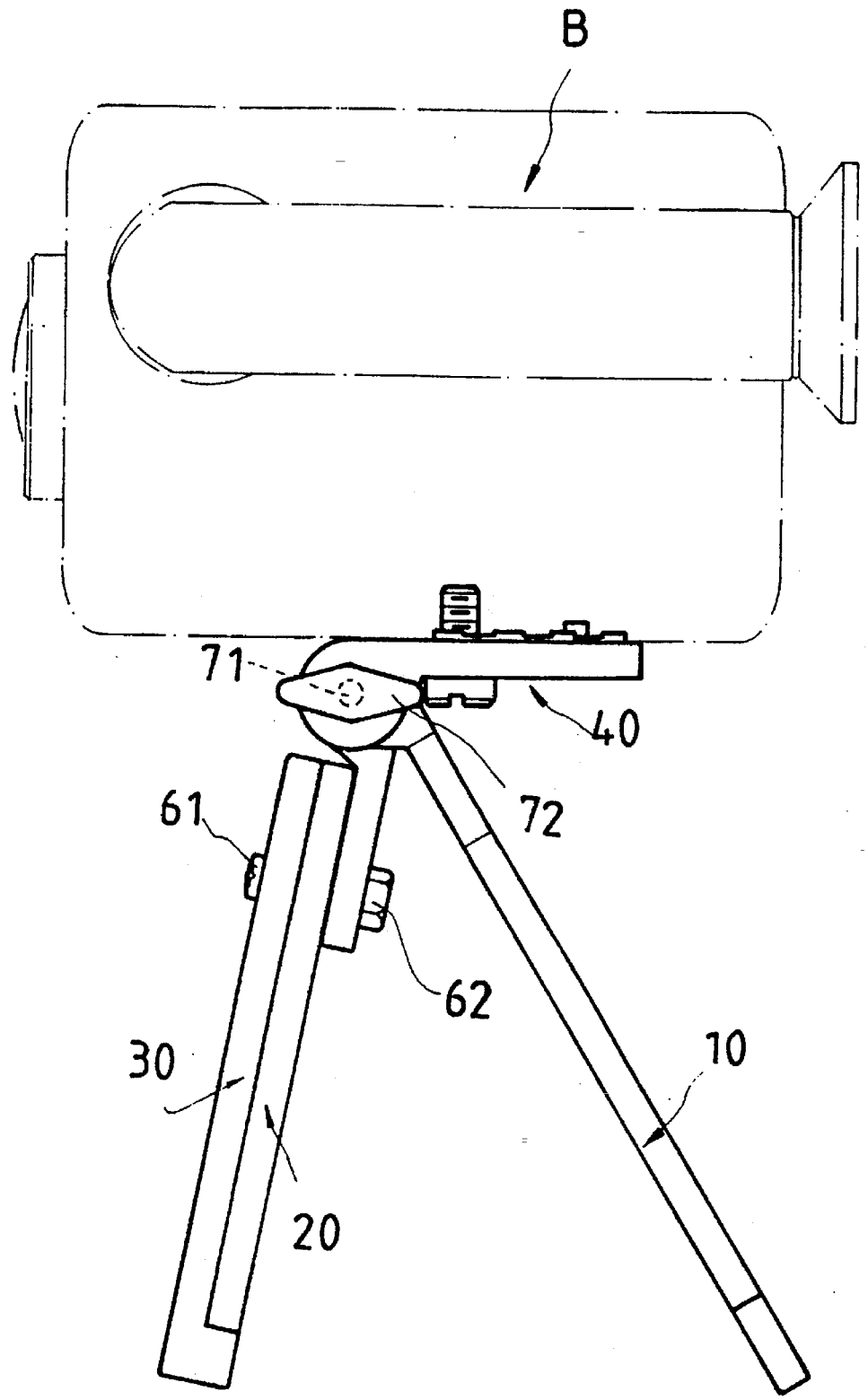
FIG. 5 is a schematic view showing the tripod of the invention supporting a photographic apparatus.

With reference to FIG. 5 which shows a photographic apparatus B supported on the camera platform 40 of the tripod of the invention. As the tripod of the invention is constituted of plate-like structures of a certain rigidity, the tripod itself has considerable structural strength. Moreover, as the angle of the left and right front legs 20, 30, rear leg 10, hinge plate 50, and camera platform 40 may be adjusted by means of the screw 61, pivot rod 71 and knob 72, the structural strength of the tripod of the invention may be sustained to achieve considerable stable support for the photographic apparatus mounted thereon. The arrangement of the screw 61 and pivot rod 71 also facilitates angle adjustment and coordination of the displacement of the legs.

Although the present invention has been illustrated and described with reference to the preferred embodiment thereof, it should be understood that it is in no way limited to the details of such embodiment but is capable of numerous modifications within the scope of the appended claims.

What is claimed is:

1. A tripod comprising:

a left front leg and a right front leg, both of which are plate-like structures of substantially the same shape and are respectively provided with through holes and curved slots near their upper ends;

a hinge plate consisting of a planar portion and two pivotal portions at one end thereof, each of said pivotal portions having a centrally disposed pivotal hole, one of said pivotal portions having a depression on an outer side thereof, said planar portion of said hinge plate having a through hole matching said through holes of said left and right front legs and a post for passing through said curved slots of said left and right front legs, a screw being passed through said through holes of said left and right front legs and said hinge plate and locked with a nut to connect the left and right front legs pivotally to the hinge plate;

a rear leg, being a plate-like structure and having a fork in an upper end thereof with two pivotal portions formed at both sides of said fork, each of said pivotal portions being provided with a centrally disposed pivotal hole, one of said pivotal portions having a lug on an inner side thereof for fitting into said depression of said one of said pivotal portions of said hinge plate;

a camera platform, being a plate-like structure and pivotally connected to said rear leg and said hinge plate, said camera platform having two side pivotal portions and a middle pivotal portions formed at a bottom end thereof such that said pivotal portions of said hinge plate and said rear leg may be accommodated in the spaces defined said side pivotal portions and middle portion of said camera platform, said pivotal portions having centrally disposed pivotal holes respectively, one of said side pivotal portions having a polygonal depression formed at an outer side thereof, said camera platform further having a recess formed at an upper side thereof, said recess being provided with a hole and a projection, a support plate made of soft plastics material is fitted onto said recess such that a screw may be used to pass through a first hole in said support plate and said hole of said recess and said projection may project through a second hole in said support plate to lock a photographic apparatus mounted on said support plate of said camera platform;

a pivot rod having a threaded portion for passing through the pivotal holes of said pivotal portions of said camera platform, said rear leg and said hinge plate to join them pivotally together, said pivot rod having a polygonal raised portion behind a head portion thereof for fitting into said polygonal depression on the outer side of said one of said side pivotal portions of said camera platform to prevent said pivot rod from turning; and a knob having a locking hole in a central portion thereof for receiving an extreme end of said pivot rod so that, after said knob is locked with said pivot rod, said knob and said pivot rod may exert pressure upon both sides of said camera platform to firmly position said camera platform, said rear leg and said hinge plate after their angles have been set.

* * * * *